(12) United States Patent
Tran et al.

(10) Patent No.: US 11,485,510 B2
(45) Date of Patent: Nov. 1, 2022

(54) DOUBLE INLETS EXHAUST SYSTEM FOR UNMANNED AERIAL VEHICLE

(71) Applicant: VIETTEL GROUP, Ha Noi (VN)

(72) Inventors: Hung Cuong Tran, Ha Noi (VN); Van Quyen Pham, Nam Dinh Province (VN); Van Su Nguyen, Hung Yen Province (VN); Van Hung Tran, Thanh Hoa Province (VN)

(73) Assignee: VIETTEL GROUP, Ha Noi (VN)

( * ) Notice: Subject to any disclaimer, the term of this patent is extended or adjusted under 35 U.S.C. 154(b) by 277 days.

(21) Appl. No.: 16/870,178

(22) Filed: May 8, 2020

(65) Prior Publication Data

US 2020/0369402 A1 Nov. 26, 2020

(30) Foreign Application Priority Data

May 24, 2019 (VN) .............................. 1-2019-02707

(51) Int. Cl.

| | |
|---|---|
| *F02K 1/34* | (2006.01) |
| *B64C 39/02* | (2006.01) |
| *F01N 1/02* | (2006.01) |
| *G10K 11/172* | (2006.01) |
| *G10K 11/162* | (2006.01) |
| *F01N 1/00* | (2006.01) |

(52) U.S. Cl.
CPC ............ *B64D 33/06* (2013.01); *B64C 39/024* (2013.01); *F01N 1/003* (2013.01); *F01N 1/02* (2013.01); *G10K 11/162* (2013.01); *G10K 11/172* (2013.01); *F01N 2470/02* (2013.01); *F01N 2470/16* (2013.01); *F01N 2470/18* (2013.01); *F01N 2490/02* (2013.01); *F01N 2590/00* (2013.01)

(58) Field of Classification Search
CPC ....... B64D 33/06; B64C 39/024; F01N 1/003; F01N 1/02; F01N 2470/02; F01N 2470/16; F01N 2470/18; F01N 2490/02; F01N 2590/00; F01N 1/089; F01N 1/023; G10K 11/162; G10K 11/172
See application file for complete search history.

(56) References Cited

U.S. PATENT DOCUMENTS

| | | | | |
|---|---|---|---|---|
| 3,420,052 A | * | 1/1969 | Miller | ..................... F01N 5/02 237/12.3 A |
| 3,744,589 A | * | 7/1973 | Mellin | ..................... F01N 1/10 181/256 |

(Continued)

OTHER PUBLICATIONS

Li H, CN-207554154-U (Abstract only). Date of Jun. 2018.*

*Primary Examiner* — Mickey H France
(74) *Attorney, Agent, or Firm* — PatentTM.US

(57) ABSTRACT

The dual inlet exhaust design for the flying device incorporates easy-to-assemble designs with low number of components, suitable for limited space and small volume requirements, good performance. The exhaust is designed as a three-chamber cylinder with two coaxial inlet pipes running through the two chambers on both sides, extending into the middle compartment. The width of the two inlet tubes in the middle compartment is different. The inlet pipe at the two compartments on both sides has a bore. The outlet tube is located in the middle compartment, deviating to the side with a smaller expansion inlet, with the longitudinal axis of the outlet tube passing through the inlet tube.

2 Claims, 1 Drawing Sheet

(56) References Cited

U.S. PATENT DOCUMENTS 3,927,731 A     12/1975   Lancaster
4,064,963 A  *   12/1977   Kaan ...................... F01N 13/18
                                                                       181/269

* cited by examiner

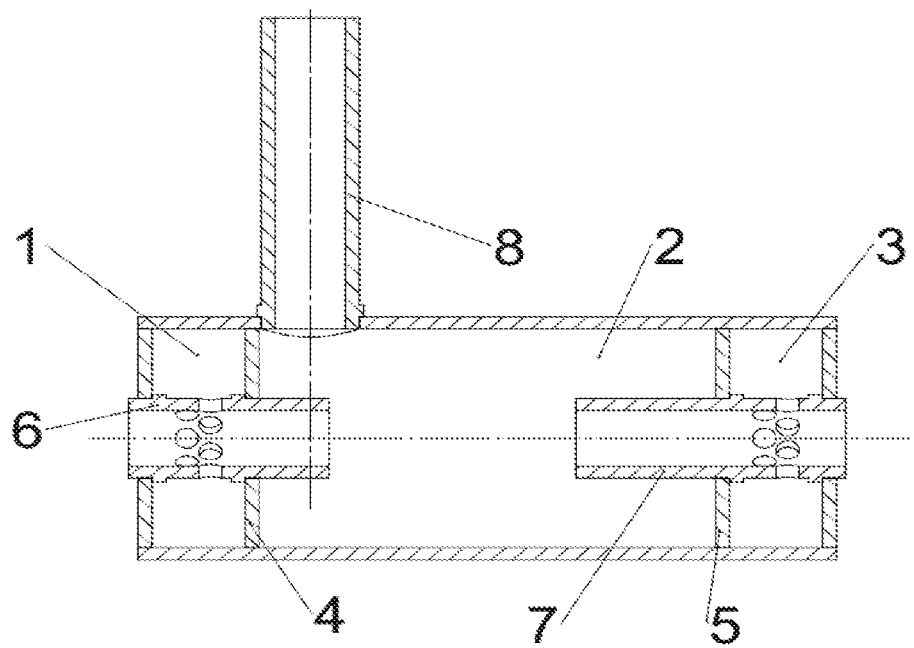

DOUBLE INLETS EXHAUST SYSTEM FOR UNMANNED AERIAL VEHICLE

FIELD OF THE INVENTION

The invention is directed to a design of an exhaust system with two inlets for a light unmanned aerial vehicle (UAV). Specifically, this invention is implemented in the design of UAV with low powered engine in condition of limited design space.

BACKGROUND DESCRIPTION

For aerial vehicles such as airplanes, an exhaust system plays a very important role. It helps reduce acoustic noise from an engine. The exhaust system can be divided in two main types: absorptive and reflective or a combination of the two.

The reflective exhaust systems use destructive interference to minimize noise. This means that the sound waves generated from the engine through the exhaust pipe will interfere with each other between the incident and reflected waves. The reflection occurs when there is a change in geometry, area or flow direction. Most reflective exhaust systems consist of typical components, such as: expanded resonance chamber, Helmholtz resonance chamber, perforation chamber, perforation baffles and inside pipeline . . . . The more complex the internal structure is, the higher noise reduction effect. However, the complicated internal structure will generate a large inverted pressure causing loss of engine power.

Absorptive exhaust systems use absorptive ability of materials to reduce acoustic noise. Energy of sound wave is converted into thermal energy through sound absorptive materials. Efficiency of exhaust systems are assessed by transmission attenuation and magnitude of inverted pressure.

The development of automotive industry has led to a diversity of exhaust system design, however, the focus is mainly on medium-to-large single inlet system.

For many of aerial vehicles, due to limitation of dimension and mass, double outlet engine is often used to optimize efficiency. To reduce noise of this type of engine, it is possible to equip a single inlet exhaust for each engine output, but the installation of multiple exhaust pipes will increase the mass of aerial vehicles. Or use a Y-tube to direct air from two engine outputs to a single exhaust, but this option requires more fabrication, more installation effort and greater space. Some inventions have designed two-inlet exhaust pipes as follows:

U.S. Pat. No. 3,927,731 "Spiral structure exhaust and two inlet" on Dec. 23, 1975 describes the configuration of two-outlet exhaust pipes, including a chamber with round cylinders and two suction ports on both sides. With spiral baffle, which can contain sound-absorbing material, goes from the center of the cavity out, connected to the discharge port. This helps extend the flow of air inside the exhaust. However, the upper spiral exhaust is complicated in manufacturing, the size of the partition is stretched, increasing the volume of the exhaust and not optimizing the volume for the flying device.

To overcome this problem, the authors have researched and proposed the design of two-head exhaust pipes combining from basic designs, easy to manufacture, suitable for limited space and small volume requirements, good performance of flying instruments.

Technical Description

The purpose of the present invention is to propose a two-inlet exhaust design for flight instruments with limited design space, small volume requirements, good performance and ease of fabrication. The exhaust is designed as a cylinder divided into three chambers with two inlets on both sides, the outlet is located in the middle compartment, which is a circular cylinder perpendicular to the axis of the exhaust.

To achieve the above-mentioned purpose, a two-inlet exhaust design for an aircraft is composed of: the body of the exhaust frame with three chambers; two inputs; output of which:

The body of the exhaust frame is a cylindrical cylinder, using aluminum alloy material, divided into three chambers by the partition between the chambers, in which the two chambers at the two ends of the exhaust frame are designed in the same way;

Two inlets are two hollow round cylinders placed coaxially on both sides of the exhaust frame, i.e. two bottom planes of the exhaust frame, the diameter of this cylinder is less than ⅓ of the circular diameter of the bottom of the frame exhaust pipe;

Two cylinders will be extended through the two ends of the frame and extend one segment into the middle compartment, in which the extension at one cylinder will be 1.2 to 1.8 times larger than the other;

The outlet is a cylindrical-shaped device, located in the center of the chamber perpendicular to the exhaust shaft on both ends, deviating towards the cavity where the cylindrical part of the shaft is shorter.

Design of two inlet exhaust pipes for flying devices according to the proposed invention, in which at the wall surface of the cylindrical shaft, the inner part of the two ends of the exhaust body are provided with holes, evenly distributed, forming a resonant chamber. For porosity, the ratio of the area in % of the perforated portion formed by the holes to the total surface area of the tube inside the cavity satisfies:

$$\sigma = 0.03739 \left(\frac{L}{D}\right)^{-8.075} + 3.288$$

where L, D are the length and diameter of the cavity, respectively.

BRIEF DESCRIPTION OF THE FIGURE

FIG. 1: A drawing of a section along the exhaust shaft.

DETAILED DESCRIPTION

Refer to FIG. 1, the exhaust of the two engine inlet for the flying device according to the proposed invention includes: the body of the exhaust frame with three chambers: the first compartment 1, the second compartment 2, the third compartment 3; two inputs; output 8. In which:

The body of the exhaust frame is circular cylinder, using aluminum alloy material, capable of working in high temperature environments. The exhaust frame body is divided into the first compartment 1, the second compartment 2, the third compartment 3 and separated by the first compartment wall 4 and the second compartment wall 5. The first compartment and the third compartment are similarly designed.

The total combined volume of the first chamber 1 and the third chamber 3 is smaller than the volume of the second chamber 2.

The two inlets are two hollow round cylinders, hereinafter referred to as first cylinders 6 and second cylinders 7 and are coaxially located on both sides of the exhaust frame body, i.e. the two flat bottom surfaces of the exhaust frame. The diameter of this cylinder is smaller than ⅓ of the diameter of the bottom of the exhaust frame.

The first cylinder 6 pierces the whole first chamber 1 and extends a distance into the second chamber 2, this interval is defined as x.

The second shaft cylinder 7 passes through the third compartment 3 and extends a distance into the second compartment 2, where the length of the extension extends into the second compartment 2, which is defined as y.

Design of two exhaust pipes in accordance with the present invention, is such that the segment y is 1.2 to 1.8 times larger than x. The extension of two cylindrical cylinders into the second chamber 2 forms an expanded resonant tube. The two extension segments have different lengths to create two different resonant frequencies, since the resonant frequency depends on the extension segment length.

At the wall surface of the first 6-axis cylinder inside the first chamber 1 and the 7-part second cylinder inside the third chamber 3 are drilled evenly distributed openings, forming a resonant chamber. Porosity, the ratio of the area in % of the bore to the total surface area of the pipe inside the cavity, is calculated using the following formula:

$$\sigma = 0.03739\left(\frac{L}{D}\right)^{-8.075} + 3.288$$

Where L and D are the length and diameter of the cavity, respectively.

Output 8 is a cylindrical-shaped device, located in the third chamber 3 perpendicular to the shaft of the two inlet exhaust pipes, deviating towards the first chamber 1 with the long axis of the shaft passing through the first cylinder 6. This helps the air flow into the second chamber from the first axis 6 cylinder have a greater degree of direction change than if output 8 were placed in the middle of the third chamber. It also helps to extend the path of air flow from the second axis 7 and increase the area being changed.

The cross-sectional area of output 8 is smaller than the total cross-sectional area of the first cylinder 6 and the second cylinder 7, which makes the air velocity at the output to be larger than the input, increasing the efficiency and decreasing noise.

The design of the two-input exhaust pipe according to the proposed invention has the following working principle: the exhaust pipe uses destructive interference to minimize noise, which means that sound waves generated from the engine when passing through the exhaust pipe will automatically interfere with reflected waves and then suppressing each other. Reflection occurs when there is a change in geometry, area or when there is a change in air flow direction.

The invention claimed is:

1. A two-inlet exhaust pipe for an aerial vehicle, comprising:
   an exhaust frame body having three chambers, two inputs, and an output of which:
   the exhaust frame body comprises a circular cylinder having two ends and a diameter, using aluminum alloy material, wherein the body is divided into the three chambers by a first and second partition separating the chambers, in which the two chambers at the two ends of the exhaust frame body are substantially the same configuration, with a total volume of the two end chambers of the exhaust frame body being smaller than a volume of the middle chamber;
   two hollow round cylinders positioned coaxially on each of the two ends of the exhaust frame body and having inlet ends in communication with an exterior of the exhaust frame body and outlet ends in communication with the middle chamber of the exhaust frame body, the diameters of the hollow round cylinders being less than ⅓ of the diameter of the exhaust frame body;
   the two hollow round cylinders extend through the two end chambers of the body of the exhaust frame and extend a first and a second distance into the middle chamber to position the two outlets within the middle chamber, in which an extension distance into the middle chamber of a first of the hollow round cylinders is from 1.2 to 1.8 times an extension distance of a second of the hollow round cylinders;
   an outlet of the exhaust frame body comprising a cylindrical-shaped device, located in the middle chamber oriented perpendicular to the exhaust shaft on both ends, positioned closer to the second outlet with a shorter extension distance into the middle cavity.

2. A two-inlet exhaust pipe for an aerial vehicle according to claim 1, in which at a wall surface of the hollow round cylinders inside the end chambers of the exhaust frame body are formed holes which are evenly distributed, forming a chamber resonate with porosity, the ratio of area in % of the formed holes portions to a total surface area of the hollow round cylinder portions inside the end chambers satisfies:

$$\sigma = 0.03739\left(\frac{L}{D}\right)^{-8.075} + 3.288$$

where L, D are a length and a diameter of the chamber, respectively.

* * * * *